(12) United States Patent
Shook et al.

(10) Patent No.: US 11,994,078 B1
(45) Date of Patent: May 28, 2024

(54) VARIABLE DISPLACEMENT PUMP WITH FLOW DELIVERY TO DIFFERENT SYSTEMS WITH DIFFERENT PRESSURE SCHEDULES

(71) Applicant: Hamilton Sundstrand Corporation, Charlotte, NC (US)

(72) Inventors: Ryan Shook, Rockford, IL (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/074,782

(22) Filed: Dec. 5, 2022

(51) Int. Cl.
*F02C 9/30* (2006.01)
*F16K 31/04* (2006.01)

(52) U.S. Cl.
CPC .............. *F02C 9/30* (2013.01); *F16K 31/046* (2013.01); *F04C 2270/18* (2013.01); *F04C 2270/585* (2013.01)

(58) Field of Classification Search
CPC .. F02C 9/30; F04B 49/002; F15B 2211/6333; F15B 2211/8752
See application file for complete search history.

(56) References Cited

U.S. PATENT DOCUMENTS

| | | | |
|---|---|---|---|
| 6,102,001 A | 8/2000 | McLevige | |
| 6,502,393 B1 * | 1/2003 | Stephenson | ........... F16K 31/408 60/424 |
| 6,810,674 B2 | 11/2004 | Clements | |
| 7,690,355 B2 | 4/2010 | Emo et al. | |
| 8,128,378 B2 | 3/2012 | Rowan et al. | |
| 9,617,923 B2 | 4/2017 | Griffiths | |
| 11,377,823 B1 * | 7/2022 | Quinn | ................... F15B 11/165 |
| 2005/0100447 A1 | 5/2005 | Desai et al. | |
| 2017/0306856 A1 | 10/2017 | Bickley | |
| 2018/0135660 A1 * | 5/2018 | Guo | ........................ F15B 11/17 |
| 2018/0340501 A1 | 11/2018 | Ni et al. | |
| 2022/0307491 A1 | 9/2022 | Rutar | |

* cited by examiner

*Primary Examiner* — Abiy Teka
(74) *Attorney, Agent, or Firm* — Kinney & Lange, P.A.

(57) ABSTRACT

A system includes a variable displacement pump (VDP) with a pump inlet and a pump outlet. The VDP is configured to receive a flow at the pump inlet at a first pressure and to outlet a flow from the pump outlet at a second pressure elevated relative to the first pressure. The VDP includes a variable displacement mechanism configured to vary the second pressure. A controller is operatively connected to a pressure sensor and to the variable displacement mechanism for control of the VDP. An output splitter is configured to split flow from the pump outlet to a first outlet branch and to a second outlet branch for supplying two different systems each having a different pressure schedule. The output splitter is operatively connected to the controller, which is configured to control the output splitter to regulate pressure in both of the first and second outlet branches.

13 Claims, 1 Drawing Sheet

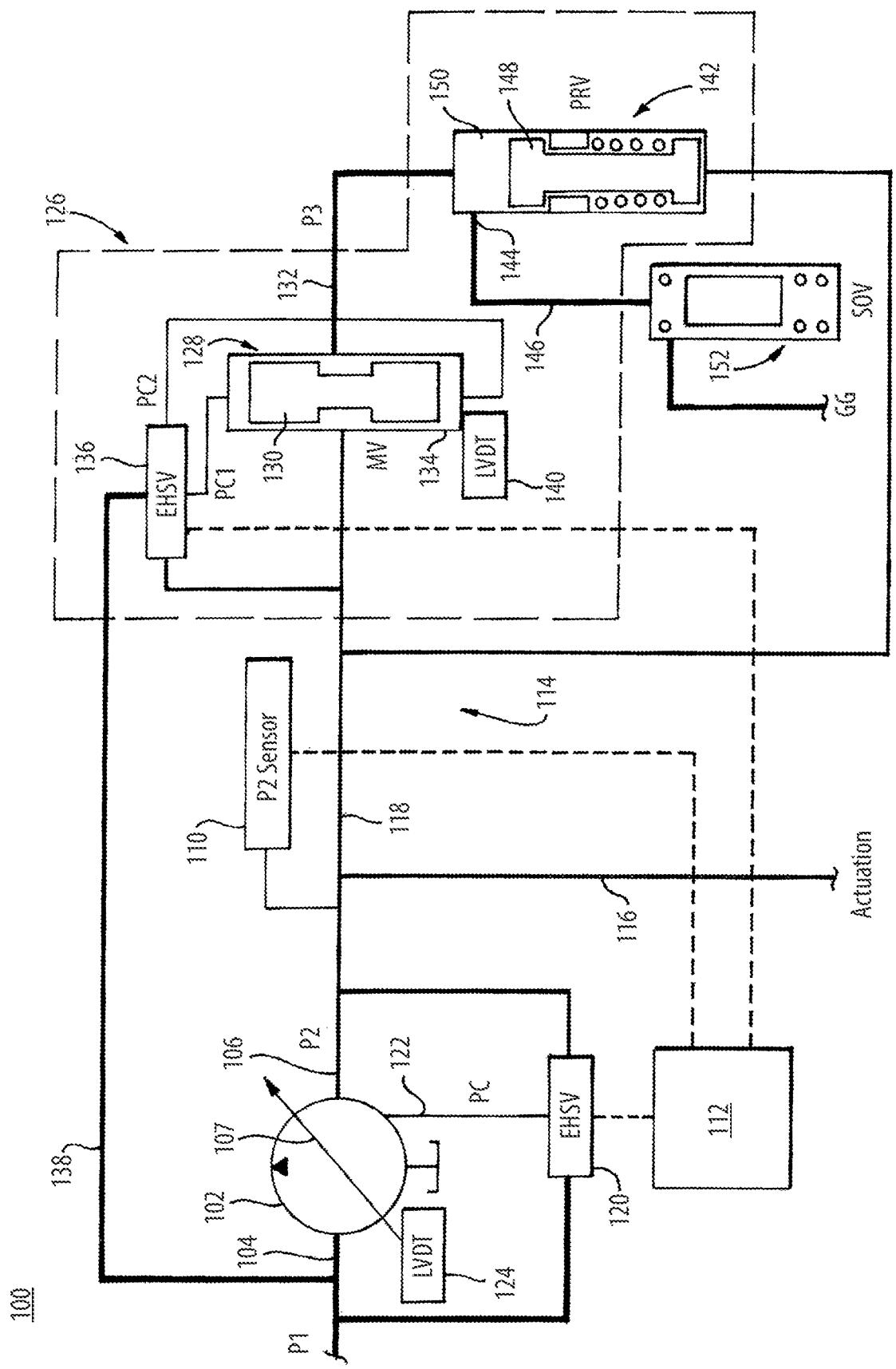

VARIABLE DISPLACEMENT PUMP WITH FLOW DELIVERY TO DIFFERENT SYSTEMS WITH DIFFERENT PRESSURE SCHEDULES

BACKGROUND

1. Field

The present disclosure relates to pump systems, and more particularly to pump systems such as for used in aerospace applications for fuel control and hydraulics.

2. Description of Related Art

Legacy fuel delivery systems use centrifugal of fixed displacement pumps. These can be upgraded to variable displacement pumps (VDPs). One downside to VDPs is they are generally larger in envelope than the centrifugal or fixed displacement pumps they are replacing.

The conventional techniques have been considered satisfactory for their intended purpose. However, there is an ever present need for improved systems and methods for pump systems. This disclosure provides a solution for this need.

SUMMARY

A system includes a variable displacement pump (VDP) with a pump inlet and a pump outlet. The VDP is configured to receive a flow at the pump inlet at a first pressure and to outlet a flow from the pump outlet at a second pressure elevated relative to the first pressure. The VDP includes a variable displacement mechanism configured to vary the second pressure. A pressure sensor is operatively connected to the pump outlet to generate feedback indicative of the second pressure. A controller is operatively connected to the pressure sensor and to the variable displacement mechanism for control of the VDP. An output splitter is configured to split flow from the pump outlet to a first outlet branch and to a second outlet branch for supplying two different systems each having a different pressure schedule. The output splitter is operatively connected to the controller, which is configured to control the output splitter to regulate pressure in both of the first and second outlet branches.

The first outlet branch can be connected to supply a hydraulic actuation system. The second outlet branch can be connected to supply a gas generating system.

An electrohydraulic servo valve (EHSV) can include a first connection to the pump inlet, a second connection to the pump outlet, and a pump control line operatively connected to actuate the variable displacement mechanism. The controller can be operatively connected to control the EHSV to actuate the variable displacement mechanism based on feedback from the pressure sensor. The variable displacement mechanism can include a position sensor configured to generate feedback indicative of position of the variable displacement mechanism. The controller can be operatively connected to the position sensor to control the EHSV based on feedback from the position sensor.

The controller can be configured control the output splitter to maintain a first pressure schedule of the first outlet branch higher than a second pressure schedule of the second outlet branch. The first pressure schedule can have a low pressure that is higher than the high pressure of the second pressure schedule.

The flow splitter can include a throttling metering system in the second outlet branch. The throttling metering system can include a metering valve (MV) connected to the second outlet branch to step down pressure from the pump outlet down to a third pressure below the second pressure. The MV can include a piston configured to meter flow from the second outlet branch to a line at the third pressure based on position of the piston in a valve sleeve. An electrohydraulic control valve (EHSV) can be operatively connected to the controller, to the pump inlet, and to the pump outlet. The EHSV can include a first control line connected to a first end of the piston, and a second control line connected to a second end of the piston. The EHSV can be configured to pressurize the first and second control lines to control position of the piston based on commands from the controller.

The MV can include a position sensor operatively connected to generate feedback indicative of position of the piston in the sleeve. The controller can be operatively connected to the position sensor to control the MV based on the feedback indicative of position of the piston in the sleeve. The throttling metering system can include a pressure regulating valve (PRV) connected to a line at the third pressure from the MV to receive flow from the MV, and an outlet configured to output regulated pressure flow to a regulated pressure flow line based on position of a regulating piston in a regulating piston sleeve. A first end of the regulating piston can be connected to the line at the third pressure from the MV. A second end of the regulating piston can be connected to the pump outlet so position of the regulating piston in the regulating sleeve is based on pressure differential between the second and third pressures.

A shutoff valve (SOV) can be connected in a line from the outlet of the PRV. The SOV can be configured to block flow from the PRV below a predetermined threshold for shutoff.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the variable displacement pump (VDP) and the flow splitter.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to supply two separate systems from one pump, even when the two systems have different pressure schedules. This can be used, for example, to use one pump to supply both a gas generator and to supply an actuation system, wherein fuel for the gas generator is used in both systems, even though the actuation system operates at a higher pressure schedule than does the gas generator.

The system 100 includes a variable displacement pump (VDP) 102 with a pump inlet 104 and a pump outlet 106. The VDP 102 is configured to receive a flow at the pump inlet 104 at a first pressure P1 and to outlet a flow from the pump outlet 106 at a second pressure P2 elevated relative to the first pressure P1. The VDP 102 includes a variable displacement mechanism 107 configured to vary the second pressure P2 given the first pressure P1. A pressure sensor 110 is operatively connected to the pump outlet 106 to generate feedback indicative of the second pressure P2. A controller 112 is operatively connected to the pressure sensor 110, as indicated in FIG. 1 by the dashed line, and to the variable displacement mechanism 107 for control of the VDP 102.

An output splitter 114 is configured to split flow from the pump outlet 106 to a first outlet branch 116 and to a second outlet branch 118 for supplying two different systems each having a different pressure schedule. The output splitter 114 is operatively connected to the controller 112, which is configured to control the output splitter 114 to regulate pressure in both of the first and second outlet branches 116, 118. The first outlet branch 116 is connected to supply a hydraulic actuation system, for example. The second outlet branch is connected to supply a gas generating system, for example, where the liquid for both the hydraulic system and the gas generating system (e.g. a gas turbine engine) is fuel.

An electrohydraulic servo valve (EHSV) 120 includes a first connection to the pump inlet 104, a second connection to the pump outlet 106, and a pump control line 122 operatively connected to actuate the variable displacement mechanism 107. The controller 112 is operatively connected to control the EHSV 120 to actuate the variable displacement mechanism 107 based on feedback from the pressure sensor P2. The variable displacement mechanism 107 can include a position sensor 124, e.g. a linear variable displacement transistor (LVDT), configured to generate feedback indicative of position of the variable displacement mechanism 107. The controller 112 is operatively connected to the position sensor 124 to control the EHSV 120 based on feedback from the position sensor 124.

The controller 124 is configured to, e.g. by including or being connected to machine readable instructions configured to cause the controller to, control the output splitter 114 to maintain a first pressure schedule of the first outlet branch 116 higher than a second pressure schedule of the second outlet branch 118. The first pressure schedule can have a low pressure that is higher than the high pressure of the second pressure schedule, for example, or there can be some overlap.

The flow splitter 114 includes a throttling metering system 126 in the second outlet branch 118. The throttling metering system 126 includes a metering valve (MV) 128 connected to the second outlet branch 118 to step down pressure from the pump outlet 106 down to a third pressure P3 below the second pressure P2. The MV 128 includes a piston 130 configured to meter flow from the second outlet branch 118 to a line 132 at the third pressure P3 based on position of the piston 130 in a valve sleeve 134. A second EHSV 136 is operatively connected to the controller 112, as indicated by the dashed line in FIG. 1, to the pump inlet 104 via a line 138, and to the pump outlet 106 via the second outlet branch 118. The EHSV 136 includes a first control line PC1 connected to a first end of the piston 130, and a second control line PC2 connected to a second end of the piston 130. The EHSV 136 is configured to pressurize the first and second control lines PC1 and PC2 to control position of the piston 130 in its sleeve 134 based on commands from the controller 112.

The MV 128 includes a position sensor 140, e.g. an LVDT, operatively connected to generate feedback indicative of position of the piston 130 in the sleeve 134. The controller 112 is operatively connected to the position sensor 140, as indicated by the dashed line in FIG. 1, to control the MV 128 based on the feedback from the position sensor 140. The actuation system can drive the P2 schedule, the pump EHSV 120 will be commanded based on the differential between requested and actual P2 pressure. The EHSV 136 can have gains in the control logic that can be adjusted based on P2 pressure.

The throttling metering system 126 includes a pressure regulating valve (PRV) 142 connected to the line 132 at the third pressure P3 from the MV 128 to receive flow from the MV 128. The PRV 142 includes an outlet 144 configured to output regulated pressure flow to a regulated pressure flow line 146 based on position of a regulating piston 148 in a regulating piston sleeve 150 of the PRV 142. A first end of the regulating piston 148 is connected to the line 132 from the MV 128 at the pressure P3. A second end of the regulating piston 148 is connected to the pump outlet 106, at the pressure P2, so position of the regulating piston 148 in the regulating sleeve 150 is based on pressure differential between the second and third pressures P2 and P3, and a bias from a biasing member or spring acting on the piston 148.

A shutoff valve (SOV) 152 is connected in the line 146 from the PRV 142. The SOV 152 is configured to block flow from the PRV 142 below a predetermined threshold for shutoff of the gas generator or other system connected to be supplied from the second branch 118, based on pressure in the line 146 and based on a piston acted on by a biasing member or spring in the SOV 152.

Utilizing a variable displacement pump with direct pump displacement control and a pressure sensor, a pump position is set to maintain a pressure and flow schedule to support two fuel demands. In an aircraft, for example, these two fuel demands could be typically actuation and burner fuel flow. The actuation pressure schedule is higher than that of the gas generator burn flow path, so a pressure throttling metering system reduces fuel pressure down from the actuator pressure schedule to that of the burner pressure schedule. Potential benefits of the systems and methods disclosed herein include, reduction of the envelope required for pumps and related equipment, reduced number of gearbox drive pads required for pumps and related equipment, and reduction of pump count/part count.

The methods and systems of the present disclosure, as described above and shown in the drawings, provide for supplying two separate systems from one pump, even when the two systems have different pressure schedules. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a variable displacement pump (VDP) with a pump inlet and a pump outlet, wherein the VDP is configured to receive a flow at the pump inlet at a first pressure and to outlet a flow from the pump outlet at a second pressure elevated relative to the first pressure, wherein the VDP includes a variable displacement mechanism configured to vary the second pressure;

a pressure sensor operatively connected to the pump outlet to generate feedback indicative of the second pressure;

a controller operatively connected to the pressure sensor and to the variable displacement mechanism for control of the VDP; and an output splitter configured to split flow from the pump outlet to a first outlet branch and to a second outlet branch for supplying two different systems each having a different pressure schedule, wherein the output splitter is operatively connected to the controller, which is configured to control the output splitter to regulate pressure in both of the first and second outlet branches, further comprising an electrohydraulic servo valve (EHSV), wherein the EHSV includes a first connection to the pump inlet, a second connection to the pump outlet, and a pump control line operatively connected to actuate the variable displacement mechanism, wherein the controller is operatively connected to control the EHSV to actuate the variable displacement mechanism based on feedback from the pressure sensor.

2. The system as recited in claim 1, wherein the variable displacement mechanism includes a position sensor configured to generate feedback indicative of position of the variable displacement mechanism, wherein the controller is operatively connected to the position sensor to control the EHSV based on feedback from the position sensor.

3. The system as recited in claim 1, wherein the controller is configured control the output splitter to maintain a first pressure schedule of the first outlet branch higher than a second pressure schedule of the second outlet branch, wherein the first pressure schedule has a low pressure that is higher than a high pressure of the second pressure schedule.

4. The system as recited in claim 1, wherein the flow splitter includes a throttling metering system in the second outlet branch.

5. The system as recited in claim 4, wherein the throttling metering system includes:

a metering valve (MV) connected to the second outlet branch to step down pressure from the pump outlet down to a third pressure below the second pressure.

6. The system as recited in claim 5, wherein the MV includes a piston configured to meter flow from the second outlet branch to a line at the third pressure based on position of the piston in a valve sleeve.

7. The system as recited in claim 6, further comprising:

an electrohydraulic control valve (EHSV) operatively connected to the controller, to the pump inlet, and to the pump outlet, wherein the EHSV includes a first control line connected to a first end of the piston, and a second control line connected to a second end of the piston, wherein the EHSV is configured to pressurize the first and second control lines to control position of the piston based on commands from the controller.

8. The system as recited in claim 7, wherein the MV includes a position sensor operatively connected to generate feedback indicative of position of the piston in the sleeve, wherein the controller is operatively connected to the position sensor to control the MV based on the feedback indicative of position of the piston in the sleeve.

9. The system as recited in claim 5, wherein the throttling metering system includes:

a pressure regulating valve (PRV) connected to a line at the third pressure from the MV to receive flow from the MV, and an outlet configured to output regulated pressure flow to a regulated pressure flow line based on position of a regulating piston in a regulating piston sleeve.

10. The system as recited in claim 9, wherein a first end of the regulating piston is connected to the line at the third pressure from the MV, and wherein a second end of the regulating piston is connected to the pump outlet so position of the regulating piston in the regulating sleeve is based on pressure differential between the second and third pressures.

11. The system as recited in claim 9, further comprising a shutoff valve (SOV) connected in a line from the outlet of the PRV, wherein the SOV is configured to block flow from the PRV below a predetermined threshold for shutoff.

12. The system as recited in claim 1, wherein the first outlet branch is connected to supply a hydraulic actuation system.

13. The system as recited in claim 1, wherein the second outlet branch is connected to supply a gas generating system.

* * * * *